United States Patent [19]

Lu

[11] Patent Number: 4,559,607
[45] Date of Patent: Dec. 17, 1985

[54] ARRANGEMENT TO PROVIDE AN ACCURATE TIME-OF-ARRIVAL INDICATION FOR A PLURALITY OF RECEIVED SIGNALS

[75] Inventor: Ning H. Lu, Parsippany, N.J.

[73] Assignee: International Telephone and Telegraph Corporation, New York, N.Y.

[21] Appl. No.: 512,810

[22] Filed: Jul. 11, 1983

[51] Int. Cl.[4] ............................................ G06F 15/336
[52] U.S. Cl. ..................................... 364/728; 364/715
[58] Field of Search ................ 364/728, 715, 819, 569

[56] References Cited

U.S. PATENT DOCUMENTS

| | | | |
|---|---|---|---|
| 4,007,330 | 2/1977 | Winters | 364/728 |
| 4,007,331 | 2/1977 | Flanagan | 364/728 |
| 4,209,835 | 6/1980 | Guadagnolo | 364/715 |
| 4,283,767 | 8/1981 | Rountree | 364/728 |

*Primary Examiner*—David H. Malzahn
*Attorney, Agent, or Firm*—John T. O'Halloran; Peter R. Ruzek

[57] ABSTRACT

The arrangement comprises N signal channels each responsive to a different one of N signals where N is an integer greater than one. Each of the N signal channels includes a sampling circuit to sample the associated one of the N signals by a different one of N phase clocks with each of the N phase clocks sampling a different one of the N signals at a predetermined different time uniformly spaced over a given time interval. A delay means is coupled to each of the sampling circuits to time align the outputs of each of the sampling circuits so that all sampled signal pulses are time shifted consistent with the associated sampling clock phases. A correlator is coupled to the output of each of the delay means to correlate the samples of the N signals with a reference signal. The output of the correlators are integrated to provide the indication of the time of arrival of the N signals.

22 Claims, 2 Drawing Figures

ARRANGEMENT TO PROVIDE AN ACCURATE TIME-OF-ARRIVAL INDICATION FOR A PLURALITY OF RECEIVED SIGNALS

BACKGROUND OF THE INVENTION

The present invention relates to an arrangement to provide an accurate time-of-arrival indication for a plurality of received signals, such as the group of pulses in the synchronization preamble of a modern communication, navigation and/or identification system.

Modern communication, navigation and identification systems often require accurate time-of-arrival (TOA) measurements or indications of received signals. One possible receiver construction is based on the use of a matched filter whose impulse response is the time-reversed signal waveform with an appropriate delay. The matched filter acts as a signal correlator and serves to detect the received signal and to estimate the instant in time when the received signal appears to be best aligned with the stored finite-duration matched waveform.

Possible approaches of the implementation of the correlator may be utilizing a continuous-time device, such as surface acoustic wave (SAW) device or a discrete-time device, such as a charge-coupled device (CCD) and digital correlator (DC). The discrete-time implementation of the signal correlator is very attractive in certain application areas where module size, cost and construction flexibility and expandability are of concern. The associated sampling losses for a discrete-time system can be classified into two areas:

(1) Sampling Signal Loss—The received signal may not be sampled at the time instant that the signal-to-noise ratio (instantaneous) is locally maximum due to the timing uncertainty.

(2) TOA Measurement Error—The accuracy of the TOA measurement is limited by the sampling rate (1/T) directly, i.e., the maximum TOA measurement error of $\pm T/2$ may occur under a single pulse operation, where T is the sampling clock time spacing.

These two associated losses may be reduced by increasing the sampling rate for better timing resolution at the cost of circuitry complexity.

In practice, a system usually provides a group of pulses in the synchronization preamble made to enhance system detection performance and anti-jamming capability.

SUMMARY OF THE INVENTION

An object of the present invention is to provide an arrangement to provide an improved accurate time-of-arrival indication for a plurality of received signals.

Another object of the present invention is to provide an arrangement to provide an improved accurate time-of-arrival indication for a plurality of received signals that reduces the two above-mentioned associated sampling losses.

A further object of the present invention is to provide an arrangement to provide an accurate time-of-arrival indication for a plurality of received signals with the required system detection performance and anti-jamming capability as well as reducing the above-mentioned sampling losses without any increase of circuitry complexity.

A feature of the present invention is the provision of an arrangement to provide an accurate time-of-arrival indication for N received signals, where N is an integer greater than one, comprising N signal channels, each responsive to a different one of the N signals, each of the N channels including first means to provide predetermined samples of the associated one of the N signals, and second means coupled to the first means to correlate the predetermined samples with a reference signal; and third means coupled to each of the second means to integrate the correlated output signals of each of the second means to provide the indication of the time-of-arrival of the N signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
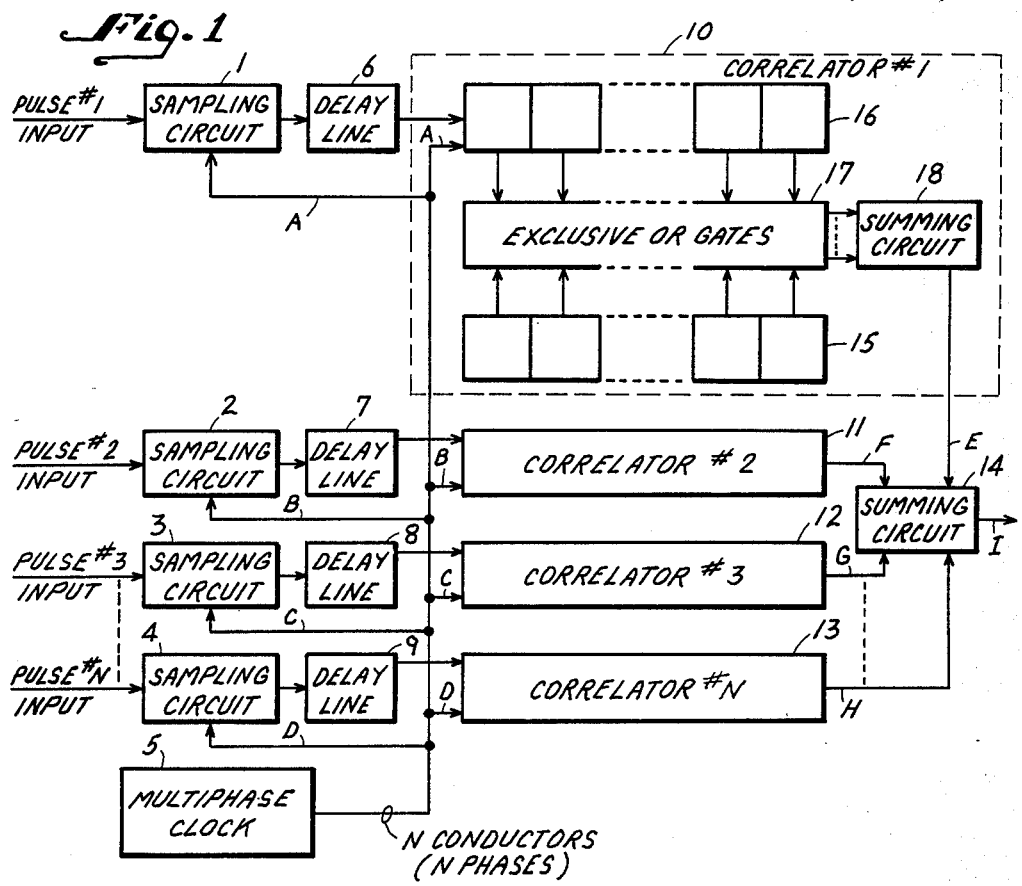
FIG. 1 is a block diagram of an arrangement to provide an accurate time-of-arrival indication for a plurality of receive signals in accordance with the principles of the the present invention.

Referring to FIG. 1, a multiple-phase sampling scheme is utilized to provide an accurate time-of-arrival indication for a plurality of received signals which, according to the example illustrated, amounts to N signals where N is equal to 4. This multiple-phase sampling scheme strictly depends on the system signal format, detection and anti-jamming performance and the TOA timing accuracy requirements. For purposes of explanation, consider the following simplified example. There are four signal pulses available in the synchronization preamble mode, the TOA timing accuracy of $\pm T_A$ is required and the time spacing between pulses are known. According to the scheme illustrated, each signal pulse is sampled at a sampling rate of $1/(8\ T_A)$ hertz (at a rate of four times lower than the rate normally required) with a properly assigned phase sampling clock. The sampling clock phases are illustrated in curves A–D of FIG. 2.

Each of the received signal pulses is sampled in a different one of the sampling circuits 1–4 by an assigned sampling clock so that each of the received signals is sampled at a relatively different timing uniformly spaced over the interval $8T_A$. The N=4 multiphase clocks are generated in the multiphase clock 5. Each of the sampled signals at the output of the respective sampling circuits 1–4 is appropriately delayed by an associated delay line 6–9 according to the given pulse time spacing so that all sampled signal pulses are time shifted consistent with the associated sampling clock phases. The output of correlators 10–13 are as illustrated in curves E–H of FIG. 2 with these outputs from correlators 10–13 being applied to a summing circuit 14 to produce the integrated output as shown in curve I in FIG. 2. The integrated output possesses a TOA measurement resolution of $\pm T_A$ seconds.

Each of the correlators 10–13 may be composed of a reference signal shift register 15 and a signal shift register 16, into which the output of the associated one of the delay lines 6–9 are clocked according to the associated multiphase clock signal. Each bit of the signal in the stages of the shift register 16 are compared with the corresponding bit in the associated shift register stage of the shift register 15 by means of EXCLUSIVE-OR gates 17. The result of the comparison determines an input to a summing circuit 18. A typical rule for an input to the summing circuit 18 is as follows:

| Signal | Reference | Input to Summing Circuit 18 |
|--------|-----------|-----------------------------|
| 0 | 0 | 0 |
| 0 | 1 | 1 |
| 1 | 0 | 1 |
| 1 | 1 | 0 |

As will be recognized, this is the truth table for an EXCLUSIVE-OR gate. If, due to logic circuit consideration, it is desired to have an output of logic "1" where the signal and reference bits are the same and to have a logic "0" output when the signal and reference bits are different, the EXCLUSIVE-OR gates could be followed by an inverter or NOT gate.

Figure 2:
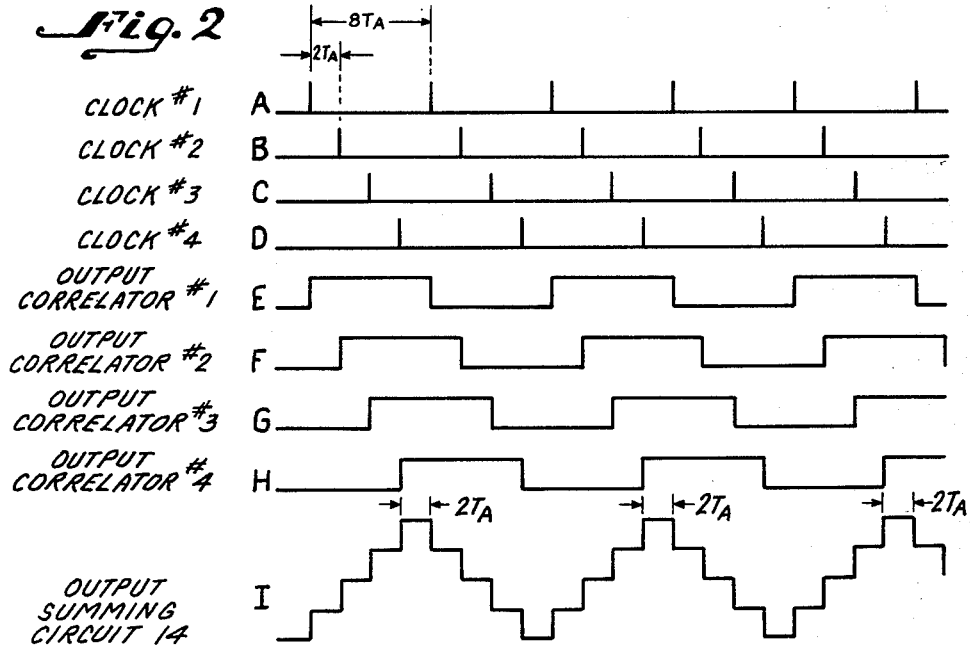
FIG. 2 is a series of curves appearing at the indicated points in the circuit of FIG. 1.

Since each of the correlators 10-13 are constructed identically and, as a result, each have a summing circuit similar to summing circuit 18, it would be possible to eliminate this separate summing circuit in the correlators by having a tree-like arrangement in summing circuit 14 wherein the outputs of each correlator are summed and then the resulting sums are further summed to provide the output I of FIG. 2.

The circuit arrangement of FIG. 1 employing the multiple-phase sampling scheme can be used to reduce the sampling losses associated with a discrete-time system mentioned hereinabove under the heading "Background of the Invention" without any increases of circuitry complexity.

It allows the use of slower speed correlator circuitry to be used to achieve a performance of N times the clock rate where N is the number of clock phases employed, which is equal to the number of input signals operated upon by the circuitry of FIG. 1.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to provide an accurate time-of-arrival indication for N received signals, where N is an integer greater than one, comprising:
   N signal channels, each responsive to a different one of said N signals, each of said N channels including:
      first means to provide predetermined samples of the associated one of said N signals, and
      second means coupled to said first means to correlate said predetermined samples with a reference signal; and
   third means coupled to each of said second means to integrate the correlated output signals of each of said second means to provide said indication of said time-of-arrival of said N signals.

2. An arrangement according to claim 1 wherein said third means includes a summing circuit coupled to each of said second means to provide said indication of said time-of-arrival of said N signals.

3. An arrangement according to claim 1, wherein each of said first means includes
   a sampling circuit to receive the associated one of said N signals and a given one of N-phase clocks, each of said N-phase clocks sampling a different one of said N signals at a predetermined different time uniformly spaced over a given time interval, and
   a delay means coupled to said sampling circuit to time align the outputs of each of said sampling circuits.

4. An arrangement according to claim 3, wherein said third means includes a summing circuit coupled to each of said second means to provide said indication of said time-of-arrival of said N signals.

5. An arrangement according to claim 3, wherein each of said second means includes
   a digital correlator coupled to an associated one of said delay means clocked by said given one of said N-phase clocks.

6. An arrangement according to claim 5, wherein said third means includes a summing circuit coupled to each of said digital correlators to provide said indication of said time-of-arrival of said N signals.

7. An arrangement according to claim 5, wherein each of said correlators includes
   a first shift register containing therein said reference signal,
   a second shift register coupled to said associated one of said delay means, output signals of said associated one of said delay means being clocked into said second shift register by said given one of said N-phase clocks, and
   comparison means coupled to each stage of each of said first and second shift registers to compare the contents of associated stages of said first and second shift registers and produce a resultant output signal.

8. An arrangement according to claim 7, wherein said third means includes a summing circuit coupled to each of said comparison means to sum each of said resultant output signals to provide said indication of said time-of-arrival of said N signals.

9. An arrangement according to claim 7, wherein said comparison means includes
   a plurality of EXCLUSIVE-OR gates equal in number to said associated stages of said first and second shift registers to enable comparison of the contents thereof, each of said gates producing at least a portion of said resultant output signal.

10. An arrangement according to claim 9, wherein said comparison means further includes
    a first summing circuit coupled to said plurality of EXCLUSIVE-OR gates to provide said resultant output signal.

11. An arrangement according to claim 10, wherein said third means includes a second summing circuit coupled to each of said first summing circuits to provide said indication of said time-of-arrival of said N signals.

12. An arrangement according to claim 9, wherein said comparison means further includes
    at least a first portion of said third means coupled to said plurality of EXCLUSIVE-OR gates to sum said portions of said resultant output signal to provide said resultant output signals.

13. An arrangement according to claim 12, wherein said third means includes a second portion coupled to each of said first portions to provide said indication of said time-of-arrival of said N signals.

14. An arrangement according to claim 13, wherein each of said first portions of said third means and said second portion of said third means is a summing circuit.

15. An arrangement according to claim 1, wherein each of said second means includes
 a digital correlator coupled to an associated one of said first means clocked by said given one of said N-phase clocks.

16. An arrangement according to claim 15, wherein each of said correlators includes
 a first shift register containing therein said reference signal,
 a second shift register coupled to said associated one of said first means, output signals of said associated one of said first means being clocked into said second shift register by said given one of said N-phase clocks, and
 comparison means coupled to each stage of each of said first and second shift registers to compare the contents of associated stages of said first and second shift registers and produce a resultant output signal.

17. An arrangement according to claim 16, wherein said comparison means includes
 a plurality of EXCLUSIVE-OR gates equal in number to said associated stages of said first and second shift registers to enable comparison of the contents thereof, each of said gates producing at least a portion of said resultant output signal.

18. An arrangement according to claim 17, wherein said comparison means further includes
 a first summing circuit coupled to said plurality of EXCLUSIVE-OR gates to provide said resultant output signal.

19. An arrangement according to claim 18, wherein said third means includes a second summing circuit coupled to each of said first summing circuits to provide said indication of said time-of-arrival of said N signals.

20. An arrangement accoding to claim 17, wherein said comparison means further includes
 at least a first portion of said third means coupled to said plurality of EXCLUSIVE-OR gates to sum said portions of said resultant output signal to provide said resultant output signals.

21. An arrangement according to claim 20, wherein said third means includes a second portion coupled to each of said first portions to provide said indication of said time-of-arrival of said N signals.

22. An arrangement according to claim 21, wherein each of said first portions of said third means and said second portion of said third means is a summing circuit.

* * * * *